US012080193B2

(12) United States Patent
 Higgins

(10) Patent No.: US 12,080,193 B2
(45) Date of Patent: *Sep. 3, 2024

(54) COLOR WHEEL AND APPARATUS FOR VIEWING ADJUSTING COLOR SCHEMES

(71) Applicant: PACIFIC CLAY PRODUCTS, INC., Lake Elsinore, CA (US)

(72) Inventor: Josh Higgins, Orange, CA (US)

(73) Assignee: PACIFIC CLAY PRODUCTS, INC., Lake Elsinore, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 17/153,664

(22) Filed: Jan. 20, 2021

(65) Prior Publication Data

US 2021/0142697 A1 May 13, 2021

Related U.S. Application Data

(63) Continuation of application No. 15/397,607, filed on Jan. 3, 2017, now Pat. No. 10,930,180.

(51) Int. Cl.
 *G09F 5/00* (2006.01)
 *G09B 1/00* (2006.01)
 *G09B 25/00* (2006.01)

(52) U.S. Cl.
 CPC .............. *G09F 5/00* (2013.01); *G09B 1/00* (2013.01); *G09B 25/00* (2013.01)

(58) Field of Classification Search
 CPC .............. G09F 5/00; G09B 1/00; G09B 25/00
 USPC ........................................................ 434/74
 See application file for complete search history.

(56) References Cited

U.S. PATENT DOCUMENTS

| | | | | |
|---|---|---|---|---|
| 886,057 | A | * | 4/1908 | Hockaday ................ G09F 5/04 434/75 |
| 2,011,843 | A | * | 8/1935 | Butler .................. A47F 7/0042 434/74 |
| 2,013,741 | A | * | 9/1935 | Butler .................. A47F 7/0042 434/74 |
| 2,668,371 | A | * | 2/1954 | Artmann ................ G01J 3/522 434/74 |
| 3,044,383 | A | | 7/1962 | Akahane |
| 4,632,241 | A | * | 12/1986 | Brough ................... A47F 7/163 190/18 R |
| 4,973,253 | A | * | 11/1990 | Shook ................ G09B 19/0023 434/104 |

(Continued)

OTHER PUBLICATIONS

"Color Wheel Masking, Part 1," J. Gurney, http://gurneyjourney.blogspot.com/2008/01/color-wheel-masking-part-1.html, Jan. 27, 2008 (Year: 2008).*

(Continued)

*Primary Examiner* — Jay Trent Liddle
*Assistant Examiner* — Alyssa N Brandley
(74) *Attorney, Agent, or Firm* — DANE IP Law PC

(57) ABSTRACT

A color wheel having a plurality of pieces is disclosed. Selected brick pieces may be stacked upon each other side-by-side and a viewing apparatus laid upon the stacked brick pieces. The viewing apparatus may have a viewing window which can be adjusted in order to adjust the percentage of each of the brick pieces being viewed through the viewing window of the viewing apparatus to provide for a more accurate perception of how the selected colored pieces will be perceived when implemented in a brick building.

15 Claims, 10 Drawing Sheets

(56) References Cited

U.S. PATENT DOCUMENTS

| | | | | | |
|---|---|---|---|---|---|
| 5,228,857 | A | * | 7/1993 | Roland | G09F 5/00 |
| | | | | | 434/74 |
| 5,803,739 | A | * | 9/1998 | Hitchcock | G09B 25/00 |
| | | | | | 434/430 |
| 8,434,250 | B2 | * | 5/2013 | Epp | G09F 5/042 |
| | | | | | 40/495 |
| 2006/0029909 | A1 | * | 2/2006 | Kaczkowski | G09B 19/0023 |
| | | | | | 434/98 |
| 2015/0248850 | A1 | * | 9/2015 | Malone | B32B 7/06 |
| | | | | | 434/98 |

OTHER PUBLICATIONS

Pantone, Formula Guide, website, retrieved from the Internet at least as early as Mar. 22, 2017, <URL:https://www.pantone.com/formula-guide>.

The Scrap Exchange, Creative Reuse Spotlight: Product Sample Boards, website, retrieved from the Internet at least as early as Mar. 22, 2017, <URL:http://scrapexchange.org/2013/02/13/creative-reuse-spotlight-product-sample-boards-2/>.

\* cited by examiner

COLOR WHEEL AND APPARATUS FOR VIEWING ADJUSTING COLOR SCHEMES

CROSS-REFERENCE TO RELATED APPLICATIONS

This application is a continuation application of U.S. patent application Ser. No. 15/397,607, filed on 2017 Jan. 3, the entire contents of which is expressly incorporated herein by reference.

STATEMENT RE: FEDERALLY SPONSORED RESEARCH/DEVELOPMENT

Not Applicable

BACKGROUND

The various embodiments and aspects described herein relate to an apparatus for viewing color schemes.

When making a brick building, the owner will select a plurality of brick colors to be implemented into the building. To do so, square pieces of bricks having different colors are mounted to a board so that the owner can select the brick color desired for the brick building. However, it is difficult to know how all of the selected color combination of brick pieces will actually be perceived by others.

Accordingly, there is a need in the art for an improved method and apparatus for selecting color schemes.

BRIEF SUMMARY

A color wheel being mountable to a board is provided herein. The color wheel comprises a plurality of brick pieces. Each brick piece may represent a different color and also have a different height compared to the other brick pieces in the color wheel. The board with the color wheel mounted thereto may be transported from place to place to show the plurality of brick pieces to potential customers of a brick building. During the presentation, the salesperson may rearrange selected brick pieces as desired by the potential customer and lay them side-by-side or stack them side-by-side to show the potential customer how a building may be perceived color wise. A viewing apparatus may be placed upon the stacked brick pieces to show only a portion of the stacked brick pieces. This controls what the potential customer sees. By altering the viewing apparatus or sliding the brick pieces, the percentage perceived by the potential customer of each of the selected brick pieces may be increased or decreased. The benefit is that the potential customer can get a better perception for how the selected pieces may look if they were implemented on the building.

More particularly, an apparatus for viewing a plurality of colors through a viewing window is disclosed. The apparatus may comprise a plurality of pie shaped brick pieces and first and second sheets. Each pie shaped brick piece may have a different color. Each pie shaped brick piece may have opposed edges that mate with each other. First and second sheets may be pivotally attached to each other. The first and second sheets may have interior edges that define an adjustable viewing window to expose different ratios of the pie shaped brick pieces laid adjacent to each other.

A first pie shaped brick pieces may have opposed linear skewed edges that mate with an adjacent second pie shaped brick piece.

The first and second sheets may have return portions at opposed end portions to form a rectangular enclosed viewing window.

In another aspect, a method of viewing a color scheme is disclosed. The method may comprise the steps of providing first and second pie shaped brick pieces, the first pie shaped brick piece having a first color wherein the first color is viewable on a display surface, the second pie shaped brick piece having a second color wherein the second color is viewable on a display surface, the first pie shaped brick piece defining a first edge, the second pie shaped brick piece defining a second edge wherein the first edge mates with the second edge along a substantial length of the first and second edges of the first and second pie shaped brick pieces; providing a first enlarged sheet sufficient to cover at least half of the first and second pie shaped pieces, the first enlarged sheet defining a first edge; providing a second enlarged sheet sufficient to cover at least half of the first and second pie shaped pieces, the second enlarged sheet defining a second edge; stacking the first and second pie shaped brick pieces so that the first edge of the first pie shaped brick piece mates with the second edge of the second pie shaped brick piece; laying the first and second enlarged sheets over the first and second pie shaped brick pieces with the first and second edges of the first and second enlarged sheets forming a viewing window; and adjusting the first and second enlarged sheets so that the first and second edges of the first and second enlarged sheets are skewed with respect to each other so that the first color through the viewing window displays a larger display surface compared to the second color.

The method may further comprise the step of pivoting the first and second enlarged sheets about a common pivot point.

In the method, the step of providing first and second pie shaped brick pieces may comprise the step of providing first and second pie shaped brick pieces wherein each piece as opposed linear edges at skewed angles with respect to each other.

The method may further comprise the step of moving the first and second pie shaped brick pieces with respect to each other along the first edges of the first and second pie shaped brick pieces.

In the method, the first and second pie shaped brick pieces may each have a different height.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
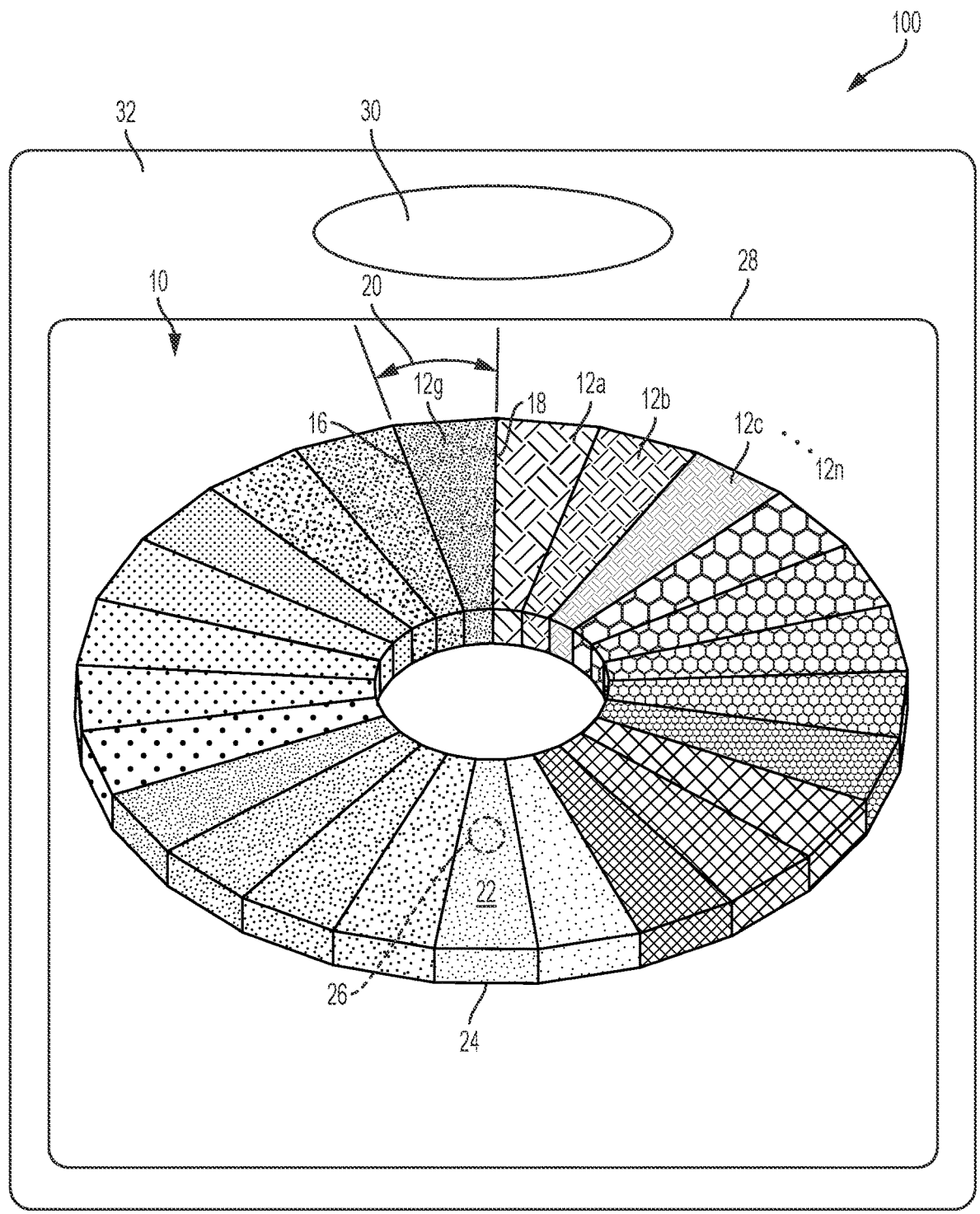
FIG. 1 illustrates a color wheel magnetically mounted to a steel plate so that the color wheel may be transported from place to place.
Figure 4:
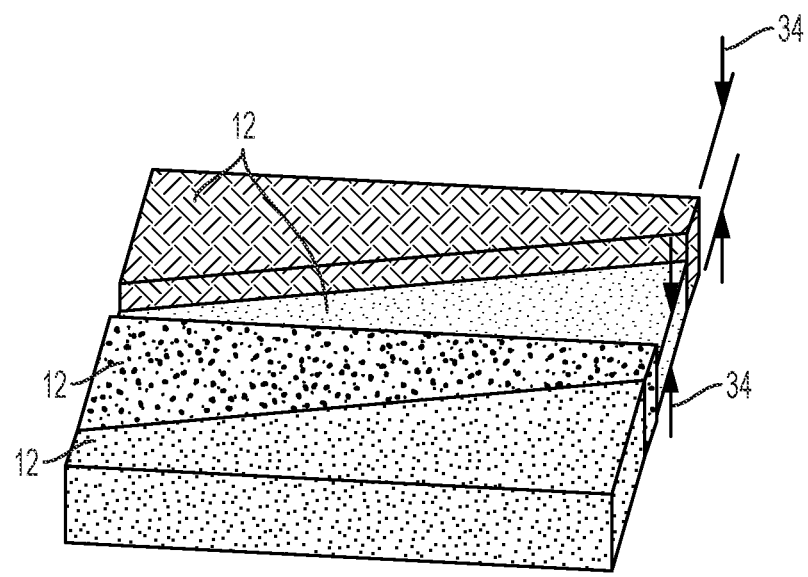
FIG. 4 illustrates a perspective view of a plurality of brick pieces stacked upon each other side-by-side.

Referring now to FIG. 1, a color wheel 10 is shown. The color wheel includes a plurality of pie shaped brick pieces 12a-n. The pie shaped brick pieces 12a-n may have different colors and may be arranged in a circular format. The circular format allows the user to see color distinctions in contrast better than if they were aligned with rectangular shaped brick pieces in rows and columns. Additionally, the pie shaped brick pieces 12a-n can be rearranged so that the user sees only those pie shaped brick pieces 12a-n of a selected group of colors. (See FIG. 2). The selected group of pie shaped brick pieces 12a-n may be stacked upon each other, as shown in FIG. 4. A viewing apparatus 14 may be laid over the stacked pie shaped brick pieces 12a-n. (See FIG. 5). The viewing apparatus 14 may be adjusted (see FIGS. 6 and 7) as well as the individual pie shaped brick pieces 12 (see FIG. 8) to adjust a ratio of the colors viewed through a viewing window of the viewing apparatus. By allowing for the adjustment in the viewing apparatus 14 and the pie shaped brick pieces 12, the user is able to see different percentages of brick colors that are more reflective of the actual percentages of the bricks that the viewer might see if that particular combination of colored bricks were used in a building. The color wheel and the ability to mix and match colors and view them through the viewing window to see different percentages of colors greatly enhances the ability of the user to see how the color combination will look like if and when the bricks are actually installed on a building.

Figure 8:
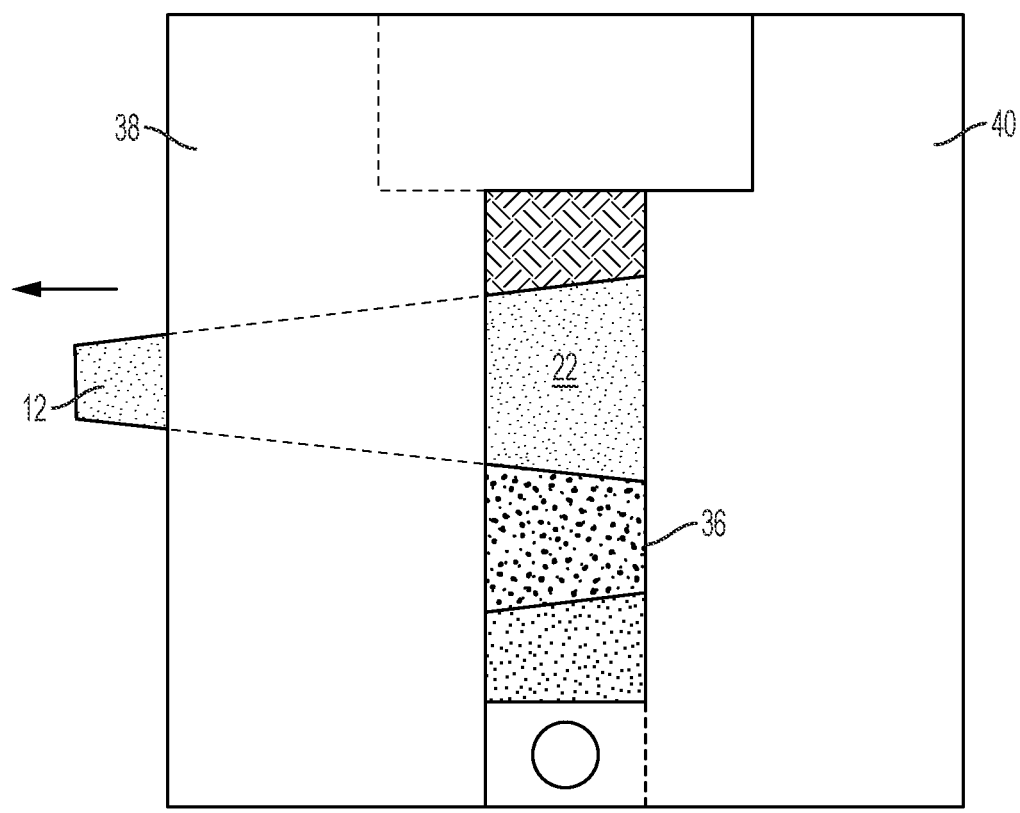
FIG. 8 illustrates the plurality of brick pieces and the viewing apparatus shown in FIG. 5 with one of the brick pieces slid to the left.

Referring now to FIG. 1, the color wheel 10 is shown. The color wheel 10 may have a plurality of pie shaped brick pieces 12. Pie shaped brick piece 12 has opposed edges 16, 18. The edges 16, 18 are preferably straight and skewed with respect to each other. Preferably, the skew angle 20 may be about 17.5° so that 25 pie shaped pieces 12 may have mating edges 16, 18 in contact each other and form a circular configuration. The first edge 16 of one pie shaped brick piece 12 mates with and contacts the second edge 18 on another adjacent pie shaped brick piece 12. With the skew angle 20 being about 17.5°, the pie shaped brick pieces 12 form a circular configuration as shown FIG. 1. Preferably, the edges 16, 18 are straight but non-straight edges 16, 18 are also contemplated. For example, the edges 16, 18 may have a wave configuration or may have a castellated configuration. However, the straight configuration is preferred so that the pie shaped brick pieces 12 may be slid out or in when a plurality of pie shaped brick pieces 12 are stacked upon each other, as shown in FIG. 8.

The pie shaped brick pieces 12 may be provided with different colors. In FIG. 1, the plurality of pie shaped brick pieces 12 is shown as having different hatch patterns which represent that the pieces 12 each has a different color. The color may be a different shade of a particular color or an entirely different color itself. When a building owner wants to install a brick façade or make a building out of brick, the building owner must select the colors including but not limited to the main or dominant color, a trim color and an accent color. At a minimum, the building owner must select two different colors. The building owner may request that the brick manufacturer supply samples of a variety colored of bricks so that the building owner may choose the desired colors from a palette of pie shaped brick pieces 12.

The pie shaped brick pieces 12 may define an exposed surface 22 and a back surface 24. The exposed surface 22 is the surface that the building owner would see. The back surface 24 is hidden from view. The back surface 24 may have a magnet 26 attached to the back surface 24. The magnet 26 may be attracted to a steel plate 28. The plurality of pie shaped pieces 12 may be secured to the steel plate 28 via the magnet 26 attached to the back surface 24 of the pie shaped brick piece 12. The magnet 26 may be secured to the back surface 24 of the pie shaped brick piece 12 with an adhesive or other fasteners known in the art.

Because the pie shaped brick pieces 12 have magnets 26 and are magnetically mounted to the steel plate 28, this type of removably attachable connection allows the user to group and regroup the pie shaped brick pieces 12 without fear that the pie shaped brick pieces 12 will be disturbed if the collection of pie shaped brick pieces 12 is bumped or somehow moved. Rather, the magnet 26 holds the pie shaped brick piece 12 securely on the steel plate 28. The steel plate 28 may also be formed with a handle 30 or mounted to a board 32 having the handle 30. The handle 30 allows the user to carry the color wheel 10 from place to place. The pie shaped brick pieces 12 are secured to the board 32 with the magnets 26 so that the pie shaped brick pieces 12 stay with the board 32 when it is transported from place to place.

Figure 2:
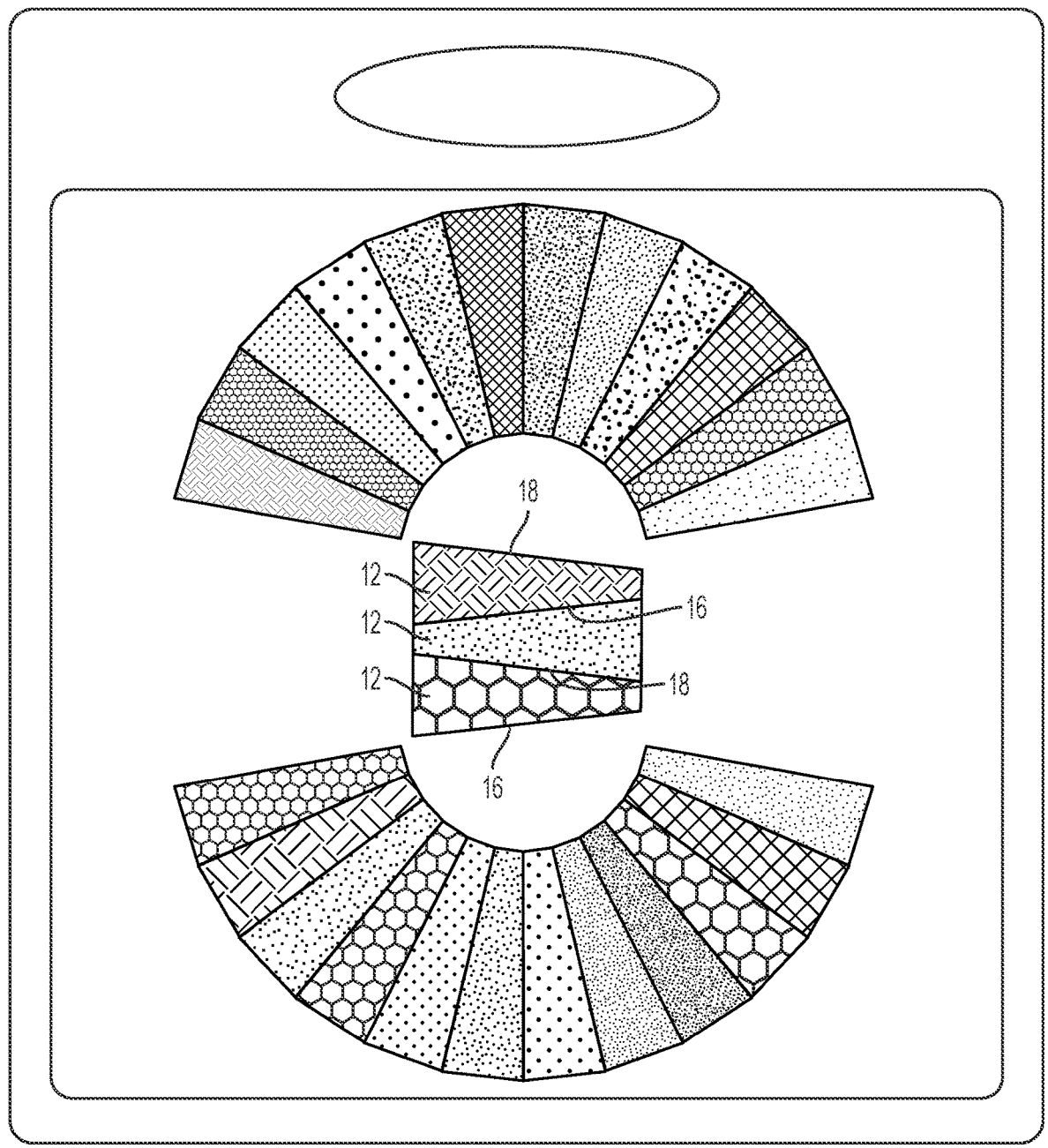
FIG. 2 illustrates a possibility of rearranging brick pieces of the color wheel.

Referring now to FIG. 2, individual pie shaped brick pieces 12 may be selected from the plurality of pie shaped brick pieces 12a-n. The selected individual pie shaped brick pieces 12 may be placed adjacent to each other as shown in the center of FIG. 2. Each of the pie shaped brick pieces 12 has skewed opposed edges 16, 18. The edges 16 of immediately adjacent pie shaped brick pieces are placed in contact and mate with each other. Also, the edges 18 of immediately adjacent pie shaped brick pieces 12 are placed in contact with each other and mate with each other. In FIG. 2, there are three selected pie shaped brick pieces 12 that are stacked upon each other so that the user can see all three colors at the same time next to each other. Two or more pie shaped brick pieces 12 may be laid adjacent to each other (i.e., stacked upon one another) so that the user can see the colors as it might be perceived if the bricks were installed on the building as a façade or used to fabricate the building.

Figure 3:
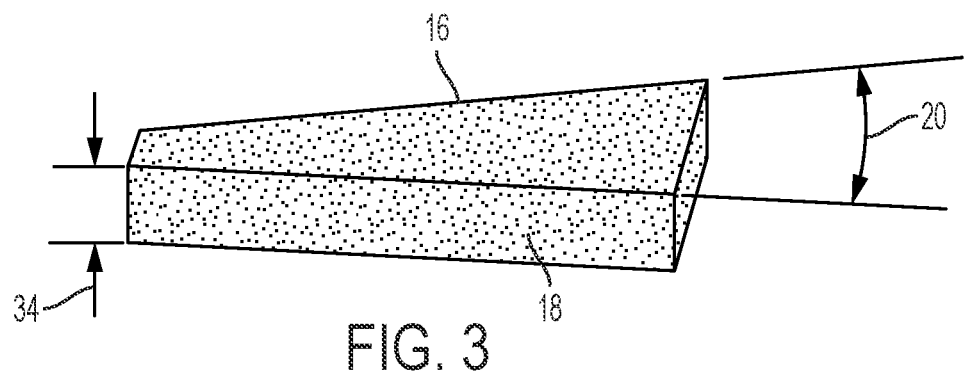
FIG. 3 is a perspective view of a brick piece.

Referring now to FIG. 3, the pie shaped brick piece 12 may define the first edge 16 and the second edge 18. The first and second edges 16, 18 may be straight and have a skew angle with respect to each other 16, 18. The pie shaped brick piece 12 may also define a height 34. Referring to FIG. 4, the bricks 12 which are stacked against each other may have different heights 34. In this manner, changes in depth of the bricks 12 may be visualized to help the user select the right colors.

Figure 5:
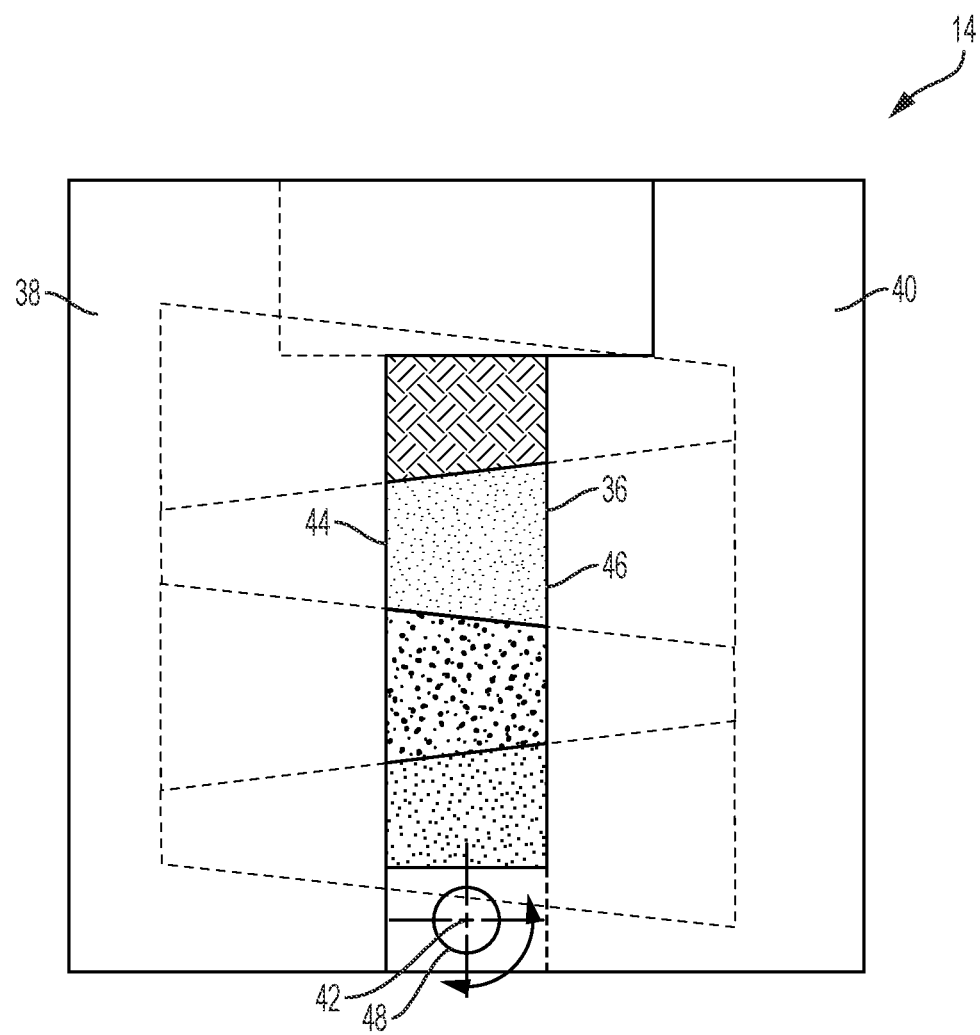
FIG. 5 illustrates a top view of the plurality of brick pieces shown in FIG. 4 with a viewing apparatus disposed on top of the stacked brick pieces.
Figure 6:
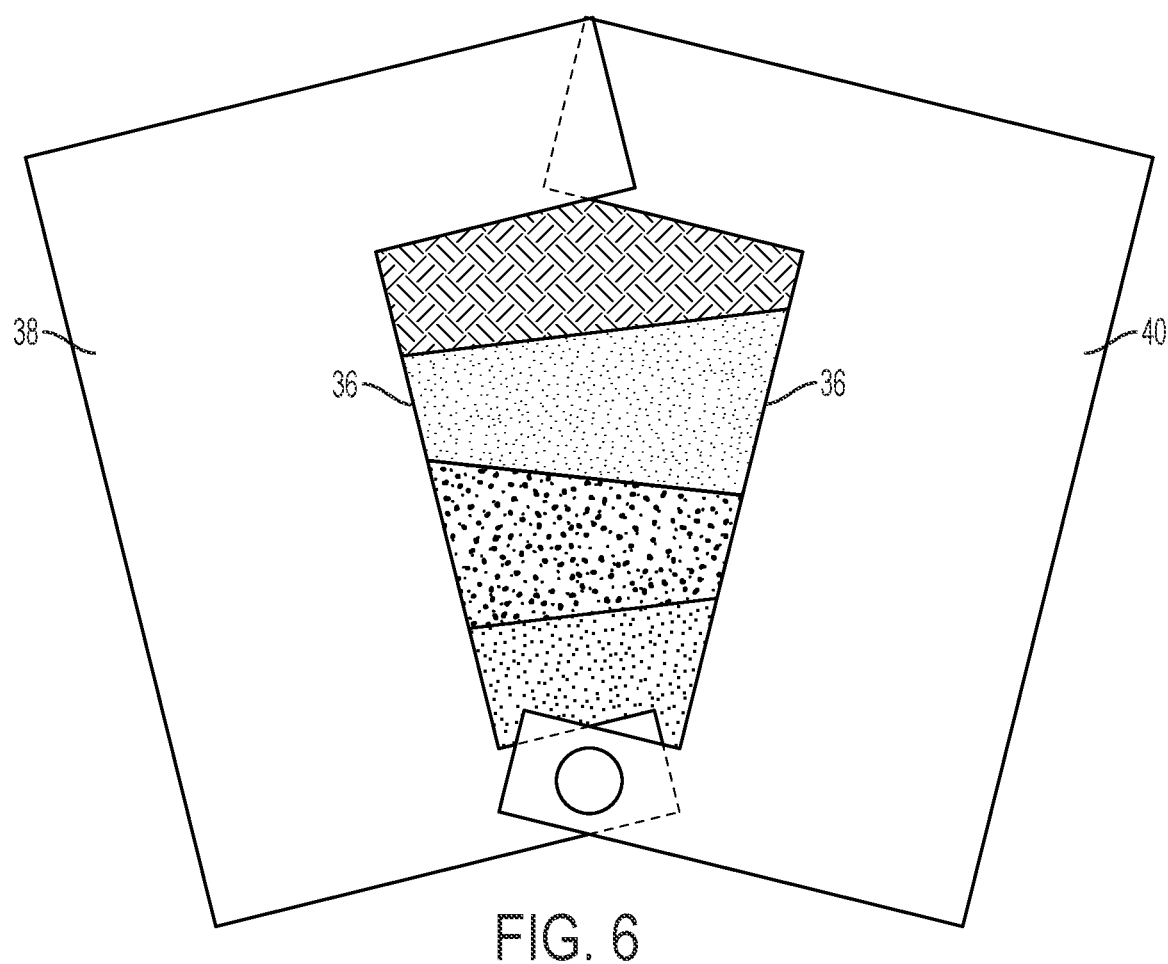
FIG. 6 illustrates the plurality of brick pieces and the viewing apparatus shown in FIG. 5 with first and second sheets of the viewing apparatus spread open.
Figure 7:
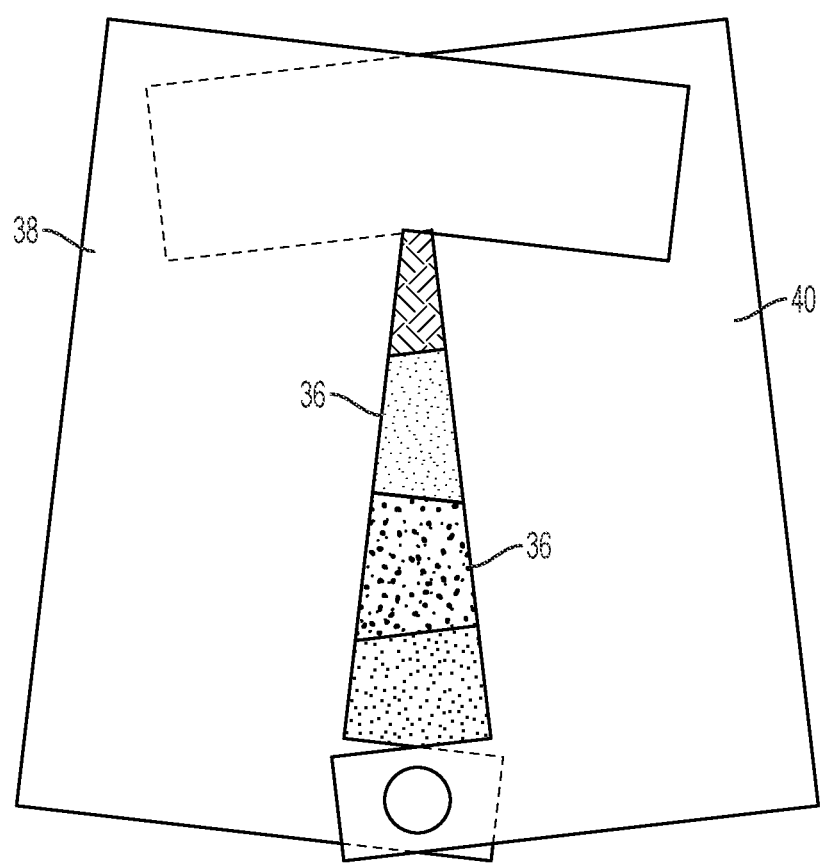
FIG. 7 illustrates the plurality of brick pieces and the viewing apparatus shown in FIG. 5 with first and second sheets of the viewing apparatus closed down.

Referring now to FIG. 5, the plurality of bricks 12 may be stacked upon each other (i.e. laid side-by-side against each other). The viewing apparatus 14 may be disposed on top of the stacked bricks 12 so that the exposed surfaces 22 of the bricks 12 can be seen through a viewing window 36 of the viewing apparatus 14. The viewing apparatus 14 may have first and second sheets 38, 40. The first and second sheets 38, 40 may be pivotally attached to each other at pivot axis 42. The first and second sheets 38, 40 may be pivotally spread apart as shown in FIG. 6 or brought closer together as shown in FIG. 7 so that the viewing window 36 is enlarged or made narrow. The viewing window 36 may be defined by two U-shaped cutouts 44, 46 in the first sheet 38 and the second sheet 40. The U-shaped cutouts 44, 46 may be identical to each other so that they form a rectangular viewing window 36 so when the first and second sheets 38, 40 are squared with each other, as shown in FIG. 5. The first and second sheets 38, 40 may have a through hole formed in the first and second sheets 38, 40 with a pin 48 disposed in the holes of the first and second sheets 38, 40. The first and second sheets 38, 40 rotate about the pin 48.

In FIG. 5, the viewing window 36 shows each of the four colors represented by each of the bricks 12 as each making up about 25% of the viewing window 36. There are four colors and each of the four colors take up about 25% of the viewing window 36. The ratios of the exposed surfaces 22 being shown through the viewing window 36 may be altered by either spreading the first and second sheets open as shown in FIG. 6 or closing down the first and second sheets 38, 40 as shown in FIG. 7. But comparing hatch patterns in FIGS. 5-7, the viewer's eyes are drawn to different hatch patterns based on the percentage being shown through the viewing window 36. The same is also true for bricks of different colors. As shown in FIG. 6, the uppermost brick 12 shows more of the exposed surface 22 compared to what is shown in FIG. 5. Also, the uppermost brick 12 shows less of the exposed surface 22 compared to the amount of exposed surface shown in FIG. 5. By spreading the first and second sheets 38, 40 further apart from each other or closer to each other, more or less of the exposed surface 22 of the brick 12 may be shown through the viewing window 36.

Moreover, the ratio of the exposed surfaces 22 shown through the viewing window 36 with respect to other exposed surfaces shown through the same viewing window may be increased or decreased. For example, in FIG. 6, the uppermost brick 12 has the highest percentage of exposed surface 22 being shown through the viewing window compared to FIGS. 5 and 7.

Figure 9:
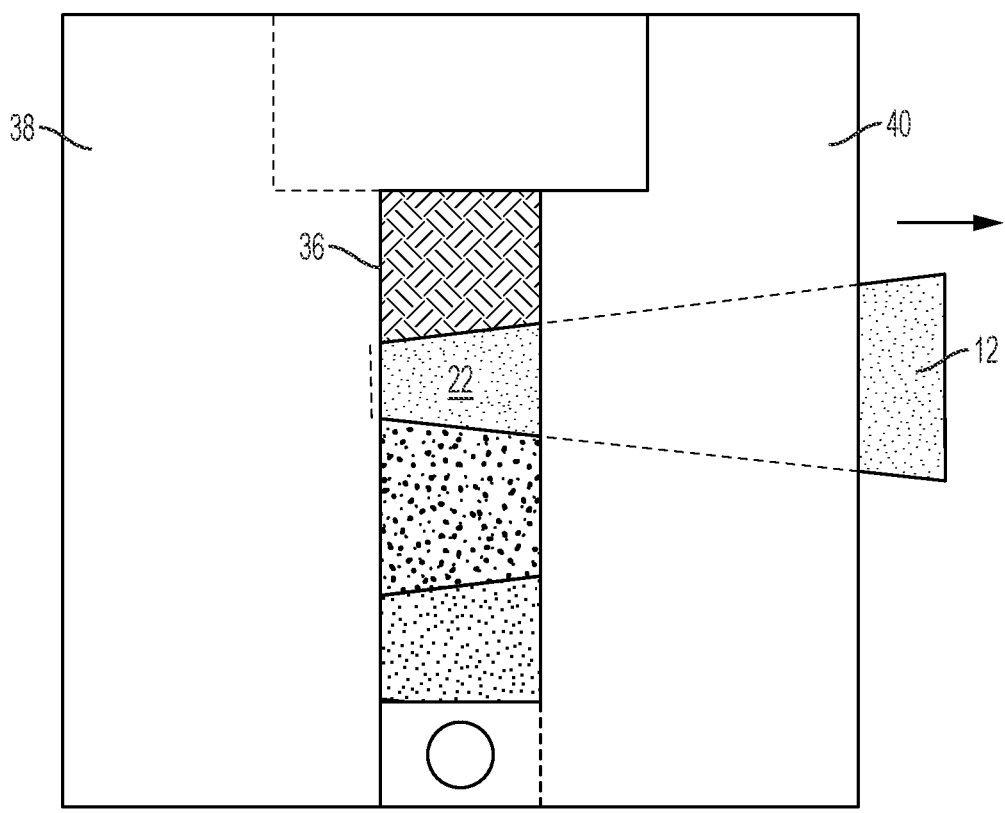
FIG. 9 illustrates the plurality of brick pieces and the viewing apparatus shown in FIG. 5 with one of the brick pieces slid to the right.
Figure 10:
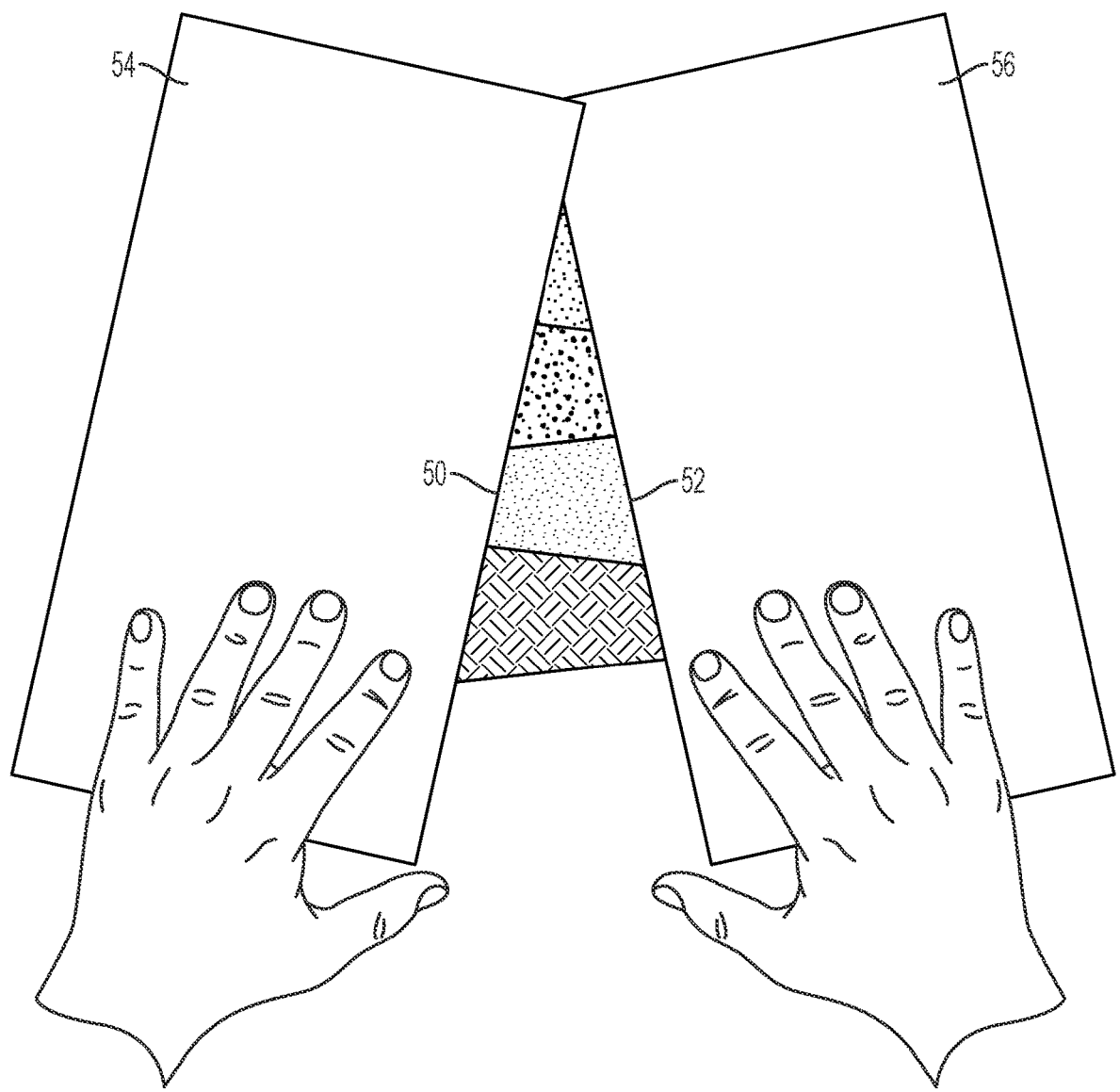
FIG. 10 illustrates the plurality of brick pieces and the viewing apparatus shown in FIG. 5 with two sheets of paper to form a viewing window.
Figure 11:
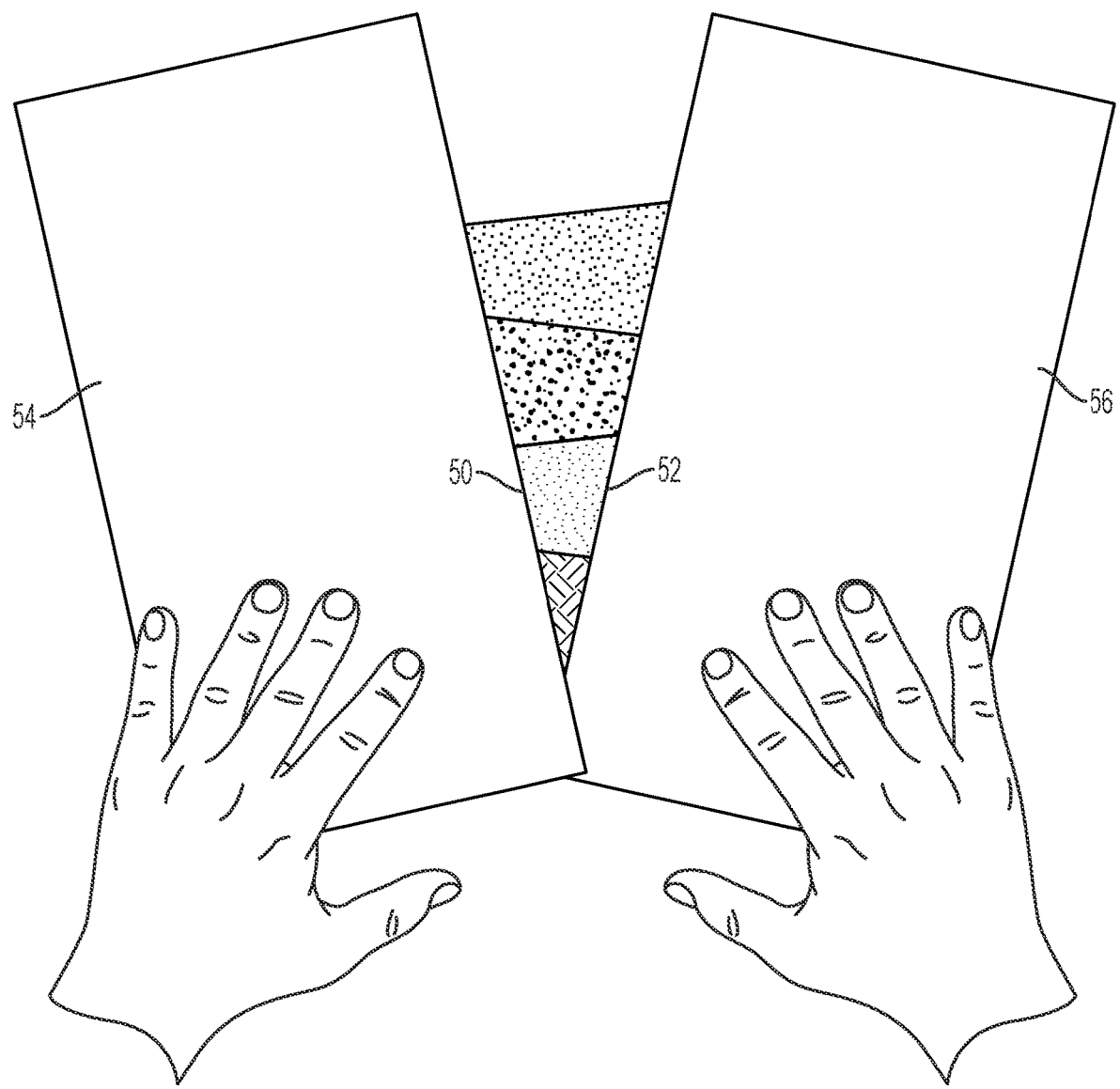
FIG. 11 illustrates the plurality of brick pieces and the viewing apparatus shown in FIG. 5 with two sheets of paper to form the viewing window wherein the two sheets of paper is in a different configuration compared to that shown in FIG. 10.

Additionally, the ratio of exposed surfaces 22 being shown through the viewing window 36 with respect to the other exposed surfaces 22 may be altered by sliding the brick piece 12 to the left or right, as shown in FIG. 8. In FIG. 8, the brick 12 is shifted to the left. In this manner, the exposed surface 22 of the brick 12 slid to the left being shown through the viewing window 36 is greater than the exposed surfaces 22 of the other bricks 12. To further alter the ratio, the first and second sheets may be spread open or brought in closer to each other as shown in FIGS. 6 and 7. Conversely, as shown in FIG. 9, the brick 12 is shifted to the right. In this manner, the exposed surface 22 of the brick 12 is slid to the right being shown through the viewing window 36 is greater than the exposed surfaces 22 of the other bricks 12. To further alter the ratio, the first and second sheets 38, 40 may be spread open or brought closer and together as shown in FIGS. 6 and 7.

Referring now to FIGS. and 10 and 11, instead of a viewing apparatus 14, the viewing window 36 may be formed with two edges 50, 52 of sheets of paper 54, 56. The two sheets of paper 54, 56 may not be pivotally attached to each other but it is contemplated that they are pivotally moved with respect to each other.

In use, the carrying board 100 may be transported place to place in order to present different colors to potential buyers. The pie shaped brick pieces 12 may be mounted to the steel plate 28 as desired by the potential customer. When the salesperson visits a new potential customer, the salesperson can remove the current set of brick pieces 12 and replace them with a different set of brick pieces 12 representing the colors requested by the potential customer. The brick pieces 12 are removably attachable to the steel plate 28 with the magnet which is permanently attached to the back side of the brick pieces 12.

Once the salesperson presents the color wheel to the customer, the customer can select different brick pieces based on their color, texture, or depth as desired. The salesperson may rearrange the selected brick pieces 12 to the middle as shown in FIG. 2. This provides a potential customer with a view of the selected bricks next to each other at a central area. The board provides for a convenient place to place as desired by the potential customer.

In a building, there may be a dominant brick color, an accent brick color, a trim brick color and/or other brick colors in a building or brick design. However, each of the different colored bricks is not used in the same proportion as each other. One brick may be used as a trim and represent about 5% of the total scene after the building is built. The dominant brick color may represent 40% of the total scene. In FIG. 2, each brick color is shown as representing 33% of the total scene. To change the percentage of the brick color being viewed by the potential customer, the salesperson may lay upon the stacked bricks 12 the viewing apparatus 14. The viewing apparatus 12 may have a viewing window 36 through which the stacked bricks 12 are viewed. This is shown in FIG. 5. The percentage of the brick being viewed through the viewing window 36 may be altered by spreading the first and second sheets and 38, 40 further apart or closer to each other as shown in FIGS. 6 and 7. Additionally, the brick pieces 12 may be slid to the left or right, as shown in FIG. 8.

Although the various aspects and embodiments were discussed in relation to selecting various colored bricks for a brick project, the various aspects and embodiments may also be useful in helping others select multiple colors for a painting project, web design, etc. For example, when homeowners select paint colors, various patches of painted pie shaped paper pieces can be used in lieu of pie shaped brick pieces discussed above. The pie shaped paper pieces may be painted or coated with a particular color. The pie shaped paper pieces can be utilized in the same manner discussed above in relation to the pie shaped brick pieces so that the end user can visualize the color percentages to be used.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of viewing a color scheme, the method comprising the steps of:

providing first and second pie shaped brick pieces, the first pie shaped brick piece having a first color wherein the first color is viewable on a display surface, the second pie shaped brick piece having a second color wherein the second color is viewable on the display surface, the first pie shaped brick piece defining a first edge, the second pie shaped brick piece defining a second edge wherein the first edge mates with the second edge along a length of the first and second edges of the first and second pie shaped brick pieces;

providing a first enlarged sheet sufficient to at least partially cover at least one of the first and second pie shaped pieces, the first enlarged sheet defining a first edge and a first return portion;

providing a second enlarged sheet sufficient to at least partially cover at least one of the first and second pie shaped pieces, the second enlarged sheet defining a second edge and a second return portion;

placing the first and second pie shaped brick pieces adjacent to one another so that the first edge of the first pie shaped brick piece is configured to mate with the second edge of the second pie shaped brick piece;

laying the first and second enlarged sheets over the first and second pie shaped brick pieces with the first and second edges of the first and second enlarged sheets and exposed edges of the first and second pie shaped brick pieces forming a viewing area;

pivoting the first and second enlarged sheets about a common pivot point so that the first and second edges of the first and second enlarged sheets are skewed with respect to each other so that the first color through the viewing area displays a larger display surface compared to the second color.

2. The method of claim 1 wherein the step of providing first and second pie shaped brick pieces comprises the step of providing first and second pie shaped brick pieces wherein each piece has opposed linear edges at skewed angles with respect to each other.

3. The method of claim 1 wherein the first and second pie shaped brick pieces each have a different height.

4. A method of viewing a color scheme, the method comprising the steps of:
providing first and second pie shaped brick pieces, the first pie shaped brick piece having a first color wherein the first color is viewable on a display surface, the second pie shaped brick piece having a second color wherein the second color is viewable on the display surface, the first pie shaped brick piece defining a first edge, the second pie shaped brick piece defining a second edge wherein the first edge mates with the second edge along a length of the first and second edges of the first and second pie shaped brick pieces;

providing a first enlarged sheet sufficient to cover at least one of the first and second pie shaped pieces, the first enlarged sheet defining a first edge;

providing a second enlarged sheet sufficient to cover at least one of the first and second pie shaped pieces, the second enlarged sheet defining a second edge;

placing the first and second pie shaped brick pieces adjacent to one another so that the first edge of the first pie shaped brick piece is configured to mate with the second edge of the second pie shaped brick piece;

laying the first and second enlarged sheets over the first and second pie shaped brick pieces with the first and second edges of the first and second enlarged sheets and exposed edges of the first and second pie shaped brick pieces forming a viewing area;

adjusting the first and second enlarged sheets so that the first and second edges of the first and second enlarged sheets are skewed with respect to each other so that the first color through the viewing area displays a larger display surface compared to the second color; and moving the first and second pie shaped brick pieces with respect to each other along the first and second edges of the first and second pie shaped brick pieces, respectively.

5. An apparatus for viewing a plurality of colors through an enclosed viewing window, the apparatus comprising:
a plurality of movable pie shaped brick pieces, each pie shaped brick piece having a different color, each pie shaped brick piece having opposed edges, two or more selected movable pie shaped brick pieces of the plurality of movable pie shaped brick pieces laid adjacent to each other, wherein one of the edges of one pie shaped brick piece is positioned adjacent to and slidably adjustable with one of the edges of an adjacent pie shaped brick piece; and
the enclosed viewing window having interior edges that define an overlay to expose different ratios of the pie shaped brick pieces laid adjacent to each other;
wherein shifting one or more of the pie shaped brick pieces laid adjacent to each other gradually changes the ratio of the two or more selected movable pie shaped brick pieces exposed through the overlay.

6. The apparatus of claim 5 wherein one edge of one of the selected pie shaped brick pieces and one edge of the adjacent pie shaped brick piece are parallel to each other when the pie shaped brick pieces are laid adjacent to each other.

7. The apparatus of claim 5 wherein the enclosed viewing window is defined by first and second sheets which are pivotally attached to each other, and the overlay has a rectangular configuration.

8. The apparatus of claim 7 wherein the first and second sheets are disposed in front of the two or more selected pie shaped brick pieces with an edge of one of the two or more selected pie shaped brick pieces contacting an edge of the other one of the two or more selected pie shaped brick pieces.

9. The apparatus of claim 7 wherein the plurality of pie shaped brick pieces includes a first pie shaped brick piece and a second pie shaped brick piece, an edge of the first pie shaped brick piece contacting an edge of the second pie shaped brick piece, a front surface of the first pie shaped brick piece being coplanar with a front surface of the second pie shaped brick piece, the first and second sheets being laid against the front surfaces of the first and second pie shaped brick pieces, the interior edges of the first and second sheets forming the overlay through which both front surfaces of the first and second pie shaped brick pieces are shown.

10. The apparatus of claim 7 wherein the first and second sheets are fabricated from paper.

11. The apparatus of claim 7 wherein the interior edges of the first and second sheets are straight.

12. The apparatus of claim 7 wherein pivoting the first and second sheets gradually changes the ratio of the two or more selected movable pie shaped brick pieces exposed through the overlay.

13. The apparatus of claim 5 wherein each of the plurality of pie shaped brick pieces has a magnet attached to a back surface and the apparatus further comprises a magnetizable panel for holding the plurality of pie shaped brick pieces in place.

14. The apparatus of claim 5 wherein each of the plurality of pie shaped brick pieces has opposed linear skewed edges and are positioned next to each other in a circle formation and attached to a panel.

15. The apparatus of claim 5 wherein each of the plurality of pie shaped brick pieces has opposed linear skewed edges that define a narrow end and a wide end of the pie shaped brick piece, and for the two or more selected movable pie shaped brick pieces of the plurality of movable pie shaped brick pieces laid adjacent to each other, the narrow end of the one pie shaped brick piece is adjacent to a wide end of another pie shaped brick piece.

* * * * *